United States Patent
Ogura et al.

(10) Patent No.: US 12,184,226 B2
(45) Date of Patent: Dec. 31, 2024

(54) SOLAR POWER GENERATION SYSTEM

(71) Applicant: OMRON Corporation, Kyoto (JP)

(72) Inventors: Ryo Ogura, Osaka (JP); Tomoko Endo, Arlington Heights, IL (US); Erica Martin, Village of Lakewood, IL (US); Tsuyoshi Uchida, Bartlett, IL (US)

(73) Assignee: OMRON CORPORATION, Kyoto (JP)

( * ) Notice: Subject to any disclaimer, the term of this patent is extended or adjusted under 35 U.S.C. 154(b) by 131 days.

(21) Appl. No.: 17/429,629

(22) PCT Filed: Feb. 28, 2019

(86) PCT No.: PCT/JP2019/007825
§ 371 (c)(1),
(2) Date: Aug. 10, 2021

(87) PCT Pub. No.: WO2020/174657
PCT Pub. Date: Sep. 3, 2020

(65) Prior Publication Data
US 2022/0109399 A1    Apr. 7, 2022

(51) Int. Cl.
*H02S 40/32* (2014.01)
*H02H 7/20* (2006.01)
(Continued)

(52) U.S. Cl.
CPC ............... *H02S 40/32* (2014.12); *H02H 7/20* (2013.01); *H02J 3/381* (2013.01); *H02S 40/36* (2014.12); *H02J 2300/24* (2020.01)

(58) Field of Classification Search
CPC .......... H02S 40/32; H02S 40/36; H02S 50/00; H02H 7/20; H02H 1/00; H02J 3/381; H02J 2300/24; Y02E 10/56
See application file for complete search history.

(56) References Cited

U.S. PATENT DOCUMENTS

2016/0190798 A1* 6/2016 Narla ...................... H02J 3/381
307/80
2017/0271875 A1* 9/2017 Narla ...................... H02S 40/32

FOREIGN PATENT DOCUMENTS

JP          8-163717 A      6/1996
JP        2004-15868 A      1/2004
(Continued)

OTHER PUBLICATIONS

The International Search Report of International Application No. PCT/JP2019/007825 issued on May 28, 2019.
(Continued)

*Primary Examiner* — Michael Y Sun
(74) *Attorney, Agent, or Firm* — SHINJYU GLOBAL IP

(57) ABSTRACT

The solar power generation system includes a string, an inverter, and shut-off devices. The string includes a plurality of solar cell module groups connected in series with each other. The solar cell module groups each include a plurality of solar cell modules. The inverter is connected to the string and converts DC power output from the solar cell modules to AC power. The shut-off devices are installed respectively in electrical paths connecting between the solar cell module groups and sever the connection between the solar cell module groups in accordance with a control signal from the inverter.

5 Claims, 5 Drawing Sheets

(51) Int. Cl.
*H02J 3/38* (2006.01)
*H02S 40/36* (2014.01)

(56) References Cited

FOREIGN PATENT DOCUMENTS

| | | |
|---|---|---|
| JP | 2004-94660 A | 3/2004 |
| JP | 2004-241789 A | 8/2004 |
| JP | 2012-511299 A | 5/2012 |
| JP | 2014-68509 A | 4/2014 |
| JP | 2017-225243 A | 12/2017 |
| WO | WO-2010078303 A2 * 7/2010 | ....... H01L 31/02021 |

OTHER PUBLICATIONS

The Written Opinion of the International Searching Authority of International Application No. PCT/JP2019/007825 issued on May 28, 2019.

* cited by examiner

| OPERATION MODE | WEATHER/ SUNSHINE | POWER GENERATION | CONTROL SIGNAL | RELAY OPERATION MODE |
|---|---|---|---|---|
| START | ☀ | YES | ON | ON |
| ACTIVE | ☀ | YES | ON | ON |
| SAFETY / NORMAL SHUT-OFF | ☾ 🌧 | NO | OFF | OFF |
| | ⛅ | UNSTABLE | ON | ON/OFF |
| EMERGENCY SAFETY SHUT-OFF | ☀ | YES | OFF | OFF |

FIG. 4

SOLAR POWER GENERATION SYSTEM

This application is the U.S. National Phase of International Application No. PCT/JP2019/007825, filed on Feb. 28, 2019.

FIELD

The present invention relates to a solar power generation system.

BACKGROUND

In the United States, for the purpose of protecting firefighters from electrical shock in an emergency such as a fire, the introduction of a so-called rapid shutdown function that immediately stops power generation by a solar power generation system during an emergency has been mandated by the National Electrical Code (NEC) for solar power generation systems. For example, Published Japanese Translation No. 2012-511299 of the PCT International Publication discloses a solar power generation system that stops the output of electrical power from a solar cell module to an inverter according to the operating state of the inverter.

SUMMARY

In a solar power generation system, in order to further improve the safety of firefighters in the event of a fire or the like, it is preferable to for example install in each solar cell module a shut-off device provided with the rapid shutdown function. However, if a shut-off device is installed for each solar cell module, the installation cost of shut-off devices becomes high.

An object of the present invention is to provide a solar power generation system capable of achieving both a reduction in the installation cost of shut-off devices and an improvement in safety in a solar power generation system.

A solar power generation system according to one aspect of the present invention includes a string, an inverter, and shut-off devices. The string includes a plurality of solar cell module groups connected in series with each other. The solar cell module groups each include a plurality of solar cell modules. The inverter is connected to the string and converts DC power output from the solar cell modules to AC power. The shut-off devices are respectively installed in electrical paths connecting between the solar cell module groups and sever a connection between the solar cell module groups in accordance with a control signal from the inverter.

In this solar power generation system, shut-off devices can sever the connection between the solar cell module groups. That is, a plurality of solar cell modules can be collectively severed by shut-off devices. Thereby, the installation cost of the shut-off devices can be reduced as compared with the case where the shut-off devices are installed for each solar cell module. In addition, it is possible to provide a safer solar power generation system as compared with the case of severing the solar cell modules and the inverter in a string unit.

Preferably, the shut-off devices are driven by power from the solar cell modules. In this case, for example, when installing shut-off devices in an existing solar power generation system, it is not necessary to connect the inverter and the shut-off devices to secure the power supply for the shut-off devices. Thereby, since additional wiring for connecting the inverter and the shut-off devices can be omitted, a reduction in the installation cost of the shut-off devices can be achieved.

Preferably, the inverter outputs the control signal to the shut-off devices by power line communication. In this case, when installing the shut-off devices in an existing solar power generation system, since additional wiring for ensuring communication between the inverter and the shut-off devices can be omitted, a reduction in the installation cost of the shut-off devices can be achieved.

Preferably, the shut-off devices are externally attached to the solar cell modules. In this case, the shut-off devices can be easily installed in an existing solar power generation system.

Preferably, the shut-off devices include a signal receiving unit for receiving a signal from the inverter and a bypass circuit for the signal receiving unit to receive the signal from the inverter in a state where the connection between the solar cell module groups is cut off. In this case, when the connection between the solar cell module groups is in the cut off state, the state in which the connection between the solar cell module groups has been cut off can be released in accordance with the signal from the inverter.

Preferably, the shut-off devices output a voltage signal to the inverter after cutting off the connection between the solar cell module groups according to the control signal from the inverter. In this case, after the connection between the solar cell module groups is cut off by the shut-off devices, it is possible to confirm by using the voltage signal whether or not the shut-off devices are operating normally on the inverter side.

BRIEF DESCRIPTION OF THE DRAWINGS

FIG. 4 is a diagram illustrating an example of an operation mode of the shut-off device.

DETAILED DESCRIPTION

Figure 1:
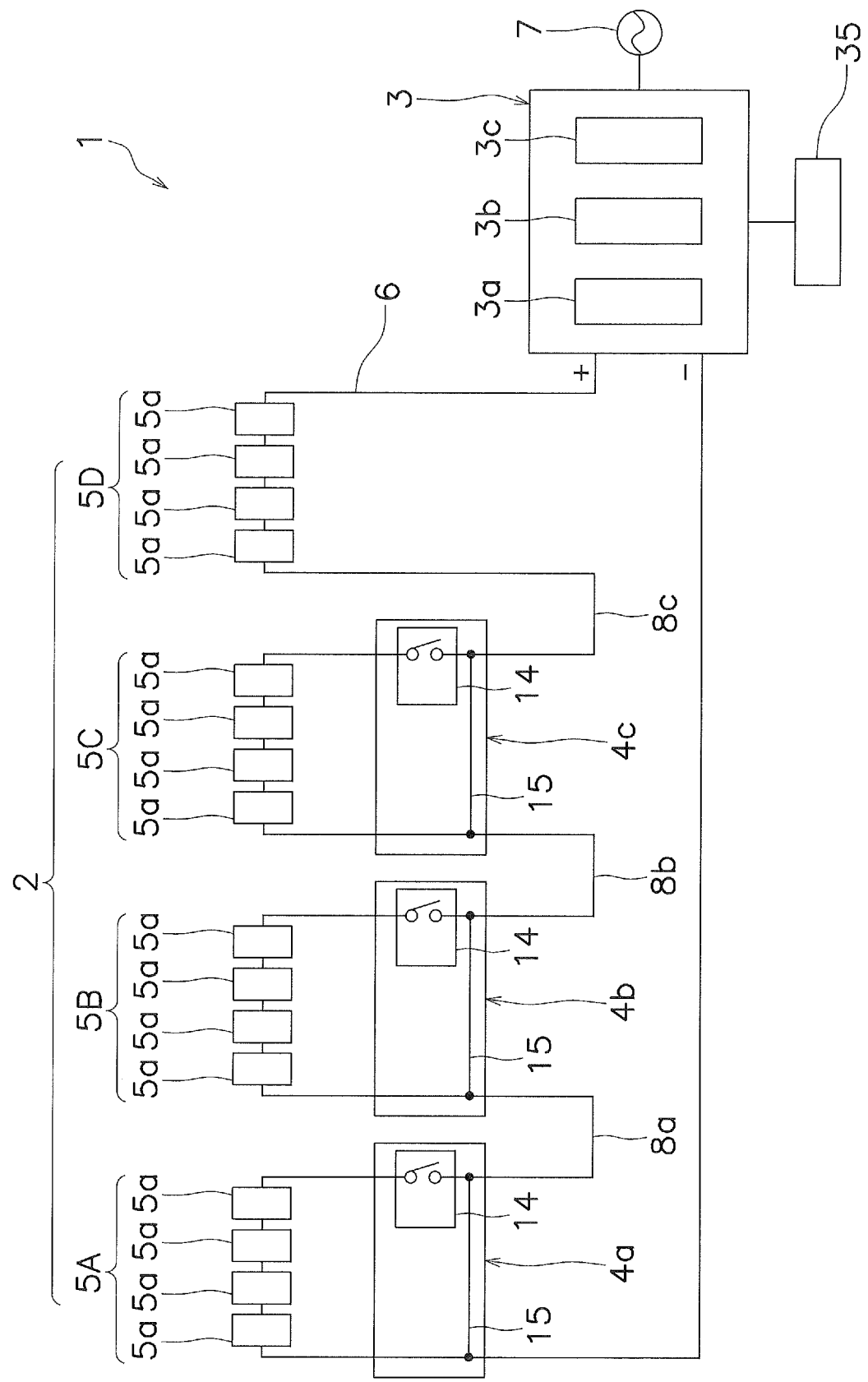
FIG. 1 is a block diagram schematically showing a configuration of a solar power generation system according to an aspect of the present invention.

FIG. 1 is a block diagram schematically showing a configuration of a solar power generation system 1 according to an aspect of the present invention. The solar power generation system 1 includes a string 2, an inverter 3, and a plurality of shut-off devices 4a to 4c.

A string 2 includes a plurality of solar cell module groups 5A to 5D connected together in series with each other. Each of the solar cell module groups 5A to 5D includes a plurality of solar cell modules 5a. Each of the solar cell module groups 5A to 5D in the present embodiment includes four solar cell modules 5a connected in series. That is, the string 2 includes 16 solar cell modules 5a connected in series. The solar power generation system 1 may include a solar cell array in which a plurality of the strings 2 are connected in parallel.

Each of the solar cell module 5a receives sunlight to generate electrical power, and outputs the generated electrical power to the inverter 3. The open circuit voltage of the solar cell module 5a is, for example, 50V.

The inverter 3 is connected to the string 2 via a power line 6. The inverter 3 converts the DC power output from the solar cell modules 5a into AC power. The inverter 3 is connected to a power system 7 and thereby supplies AC power to a commercial power system or a load device.

Specifically, the inverter 3 includes a DC/DC converter 3a, a DC/AC inverter 3b, and a control unit 3c. The DC/DC converter 3a converts the voltage of the electrical power output from the solar cell modules 5a into a predetermined voltage that is input to the DC/AC inverter 3b. The DC/AC inverter 3b converts the DC power output from the solar cell modules 5a into AC power via the DC/DC converter 3a. The control unit 3c includes a CPU, a memory, and the like, and controls the DC/DC converter 3a and the DC/AC inverter 3b. Further, the control unit 3c outputs a control signal to the shut-off devices 4a to 4c by power line communication.

The shut-off devices 4a to 4c are installed in electrical paths 8a to 8c connecting the solar cell module groups 5A to 5D, respectively. The shut-off devices 4a to 4c are externally attached to the solar cell modules 5a. The shut-off devices 4a to 4c sever the connections between the solar cell module groups 5A to 5D in response to the control signal from the control unit 3c of the inverter 3. Further, the shut-off devices 4a to 4c output a voltage signal (of 1 V, for example) to the inverter 3 after severing the connections between the solar cell module groups 5A to 5D in response to the control signal from the inverter 3.

The electrical path 8a is an electrical path that connects the solar cell module group 5A and the solar cell module group 5B. The shut-off device 4a is installed in the electrical path 8a and severs the electrical path 8a in accordance with the control signal from the control unit 3c of the inverter 3.

The electrical path 8b is an electrical path that connects the solar cell module group 5B and the solar cell module group 5C. The shut-off device 4b is installed in the electrical path 8b and severs the electrical path 8b in accordance with the control signal from the control unit 3c of the inverter 3.

The electrical path 8c is an electrical path that connects the solar cell module group 5C and the solar cell module group 5D. The shut-off device 4c is installed in the electrical path 8c and severs the electrical path 8c in accordance with the control signal from the control unit 3c of the inverter 3.

Figure 2:
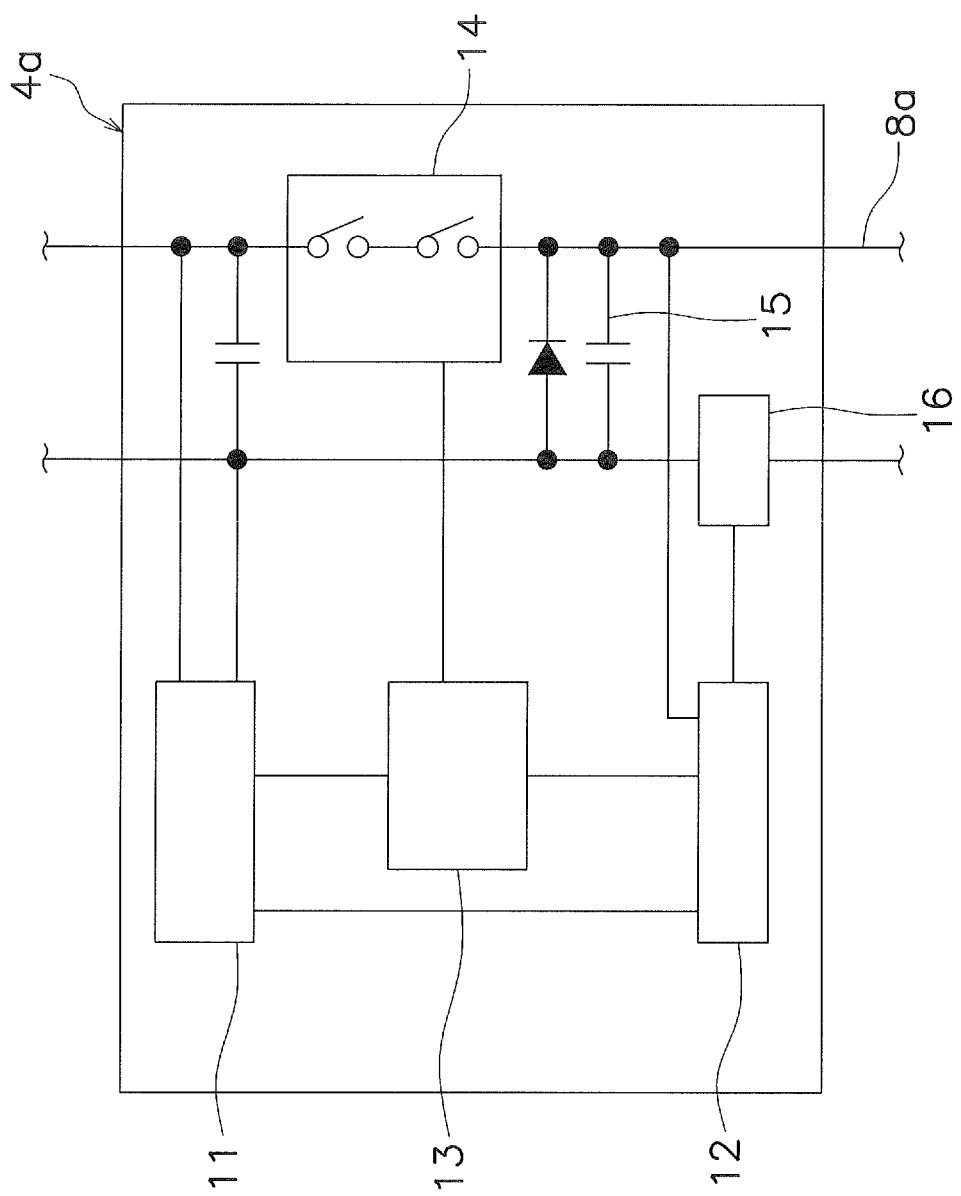
FIG. 2 is a block diagram schematically showing a configuration of a shut-off device.

FIG. 2 is a block diagram schematically showing a configuration of the shut-off device 4a. The shut-off device 4a is driven by the electrical power generated by the solar cell modules 5a. Specifically, the shut-off device 4a includes a regulator 11, a signal receiving unit 12, a relay control unit 13, a relay 14, and a bypass circuit 15.

Figure 3:
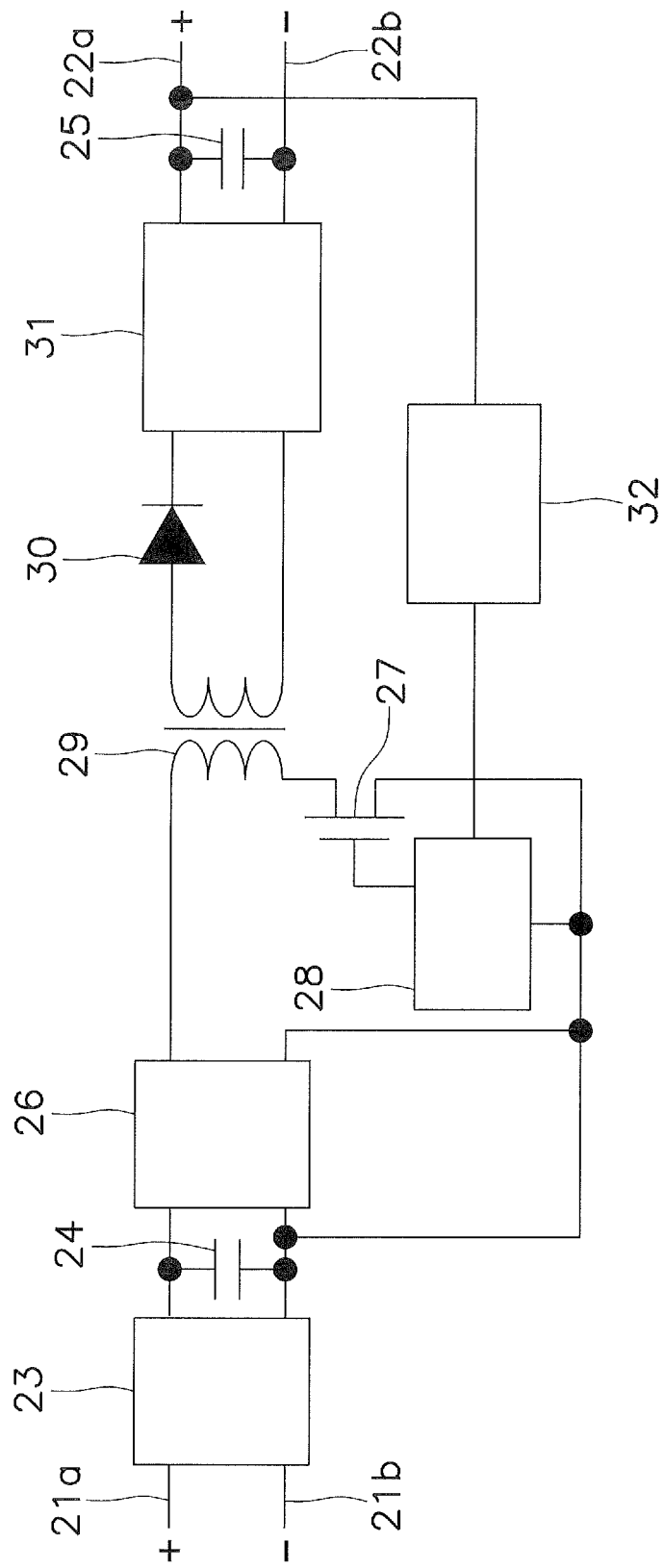
FIG. 3 is a circuit diagram schematically showing a configuration of the regulator.

The regulator 11 uses the electrical power generated by the solar cell modules 5a of the solar cell module group 5A as a power source to generate a drive power source for driving the shut-off device 4a and supplies the drive power source in a stable state to the shut-off device 4a. FIG. 3 is a circuit diagram schematically showing the configuration of the regulator 11. The configuration of the regulator 11 is a well-known configuration, and includes input terminals 21a, 21b, output terminals 22a, 22b, a line filter 23, capacitors 24, 25, a booster circuit 26, a switching element 27, a control circuit 28, a transformer 29, a diode 30, a DC/DC converter 31, a feedback circuit 32 and the like.

The signal receiving unit 12 receives the control signal from the control unit 3c of the inverter 3 and outputs the received control signal to the relay control unit 13. Specifically, the signal receiving unit 12 receives the control signal from the control unit 3c of the inverter 3 via a signal detecting unit 16 that detects the control signal from the control unit 3c of the inverter 3. Further, the signal receiving unit 12 outputs a voltage signal (of 1 V, for example) to the inverter 3 via the power line 6 after the connection between the solar cell module groups 5A to 5D is shut off in response to the control signal from the inverter 3.

On the basis of the signal output from the signal receiving unit 12, the relay control unit 13 controls the current value flowing through the coil of the relay 14 to control the opening and closing of the contacts of the relay 14.

The relay 14 is, for example, a mechanical relay in which contacts are connected in series and is capable of opening and closing a high-voltage direct current. When the drive power is not supplied to the shut-off device 4a, the contacts of the relay 14 are always in the open state. That is, when the shut-off devices 4a to 4c are not driven, the connection between the solar cell module groups 5A and 5D is shut off.

The bypass circuit 15 is a circuit for allowing the signal receiving unit 12 to receive the control signal from the control unit 3c when the shut-off device 4a is in the shut-off state. When the connection between the solar cell module groups 5A and 5D is shut off, the signal receiving unit 12 can receive the control signal from the control unit 3c via the bypass circuit 15. Further, the bypass circuit 15 enables the voltage signal output from the signal receiving unit 12 to be received on the inverter 3 side. Since the configurations of the shut-off device 4b and the shut-off device 4c are the same as those of the shut-off device 4a, descriptions thereof will be omitted.

Next, an example of the operation mode of the shut-off device 4a will be described with reference to FIG. 4. The operation mode of the shut-off device 4a includes the three operation modes of a start mode, an active mode, and a safety mode. The safety mode includes a normal shut-off mode and an emergency safety shut-off mode. Therefore, the shut-off device 4a operates in four operation modes: a start mode, an active mode, a normal shut-off mode, and an emergency safety shut-off mode.

Figure 5:
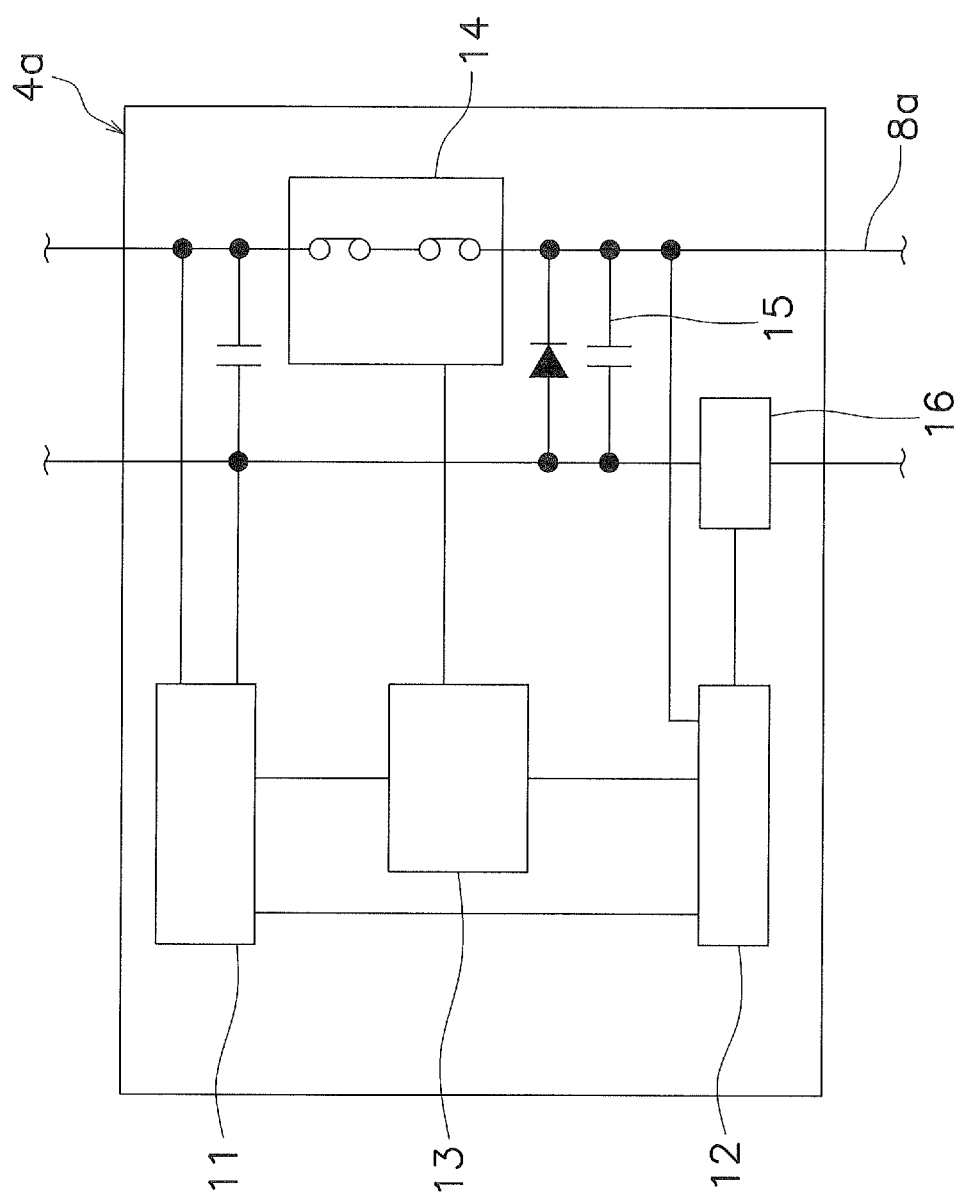
FIG. 5 is a block diagram schematically showing a configuration of a shut-off device.

The start mode is a mode when sunlight starts to hit the solar cell module 5a. At this time, each of the solar cell modules 5a receives sunlight to generate electrical power. Then, the shut-off device 4a is driven by the drive power source generated by the regulator 11 from the electrical power generated by the solar cell module 5a. When the shut-off device 4a is driven whereby the relay control unit 13 receives the control signal from the control unit 3c of the inverter 3 via the signal receiving unit 12, the relay control unit 13 performs control so as to close the contacts of the relay 14 as shown in FIG. 5. As a result, the solar cell module group 5A and the solar cell module group 5B are connected via the shut-off device 4a, and the electrical power generated by the solar cell modules 5a is output to the inverter 3.

The active mode is a state in which each of the solar cell module 5a receives sunlight during the day to generate electricity, which is substantially the same as the start mode. Therefore, in the active mode, the solar cell module group 5A and the solar cell module group 5B are in a connected state via the shut-off device 4a. That is, the solar cell module groups 5A to 5D are in a state of being connected via the breaking devices 4a to 4c, and the electrical power generated by the solar cell modules 5a is output to the inverter 3.

The normal shut-off mode is the mode when the solar cell modules 5a are not receiving sunlight during nighttime or due to the influence of the weather such as rain. Therefore, in the normal shut-off mode, power is not generated by the solar cell modules 5a, and no drive power is supplied to the shut-off device 4a. Therefore, in the normal shut-off mode, the connection between the solar cell module groups 5A to 5D is shut off. In the normal shut-off mode, no control signal is output from the control unit 3c of the inverter 3 to the shut-off devices 4a to 4c. Note that, when power is supplied to the inverter 3 from the AC power supply in the normal shut-off mode, the control signal may be in the ON state, that is, the control signal from the control unit 3c of the inverter 3 may be constantly output.

In the normal shut-off mode, when the weather is unstable and the power generation of the solar cell modules 5a is unstable, the relay control unit 13 controls the opening and closing of the contacts of the relay 14 in response to the control signal of the control unit 3c of the inverter 3.

The emergency safety shut-off mode is a mode that shuts off the connection between the solar cell module groups 5A to 5D, during the start mode or the active mode, so as to stop the output of electrical power from the solar cell modules 5a to the inverter 3. In the present embodiment, as shown in FIG. 1, an operation switch 35 is connected to the inverter 3, and when the operation switch 35 is operated while the shut-off device 4a is in the start mode or the active mode, the operation mode of the shut-off device 4a is switched to the emergency safety shut-off mode.

Specifically, when the operation switch 35 is operated, the control unit 3c outputs a control signal for emergency shut-off for shutting off the connection between the solar cell module groups 5A to 5D. When the signal detecting unit 16 detects the control signal for emergency shutoff, the contacts of the relay 14 are opened via the signal receiving unit 12 and the relay control unit 13, and as shown in FIG. 1, the connection between the solar cell module groups 5A to 5D is shut off. The shut-off devices 4a to 4c may also be configured so as to sever the connections between the solar cell module groups 5A to 5D not only when the control signal for emergency shut-off is output, but also when the signal detecting unit 16 detects that the control signal output from the control unit 3c of the inverter 3 has been stopped for a certain period during the start mode or the active mode.

In the solar power generation system 1 having the above configuration, when the operation mode of the shut-off devices 4a to 4c is the emergency safety shut-off mode, the connection between the solar cell module groups 5A to 5D is shut off by the shut-off devices 4a to 4c. Thereby, plurality of solar cell modules 5a (four solar cell modules in the present embodiment) can be collectively severed, and thereby it is possible to achieve a reduction in the installation cost of shut-off devices compared to the case where a shut-off device is installed for each of the solar cell modules 5a.

Further, it is possible to provide a solar power generation system 1 having higher safety than the case where the solar cell modules 5a and the inverters 3 are severed in the string 2 unit. Specifically, when the open circuit voltage of the solar cell modules 5a is 50 V, the open circuit voltage for each of the solar cell module groups 5A to 5D in the present embodiment is 200 V, and the open circuit voltage of the string 2 becomes 800 V. Accordingly, if the solar cell modules 5a continue to generate power after the connection between the solar cell module groups 5A to 5D is cut off, the voltage of the solar cell module groups 5A to 5D becomes 200V at the maximum, and the safety is higher than when the connection with the inverter 3 is severed in the string 2 unit.

Further, in the solar power generation system 1, it is possible to secure communication between the shut-off devices 4a to 4c and the inverter 3 by using the power line 6. As a result, for example, when the shut-off devices 4a to 4c are installed in an existing solar power generation system, no additional wiring for connecting the inverter 3 and the shut-off devices 4a to 4c is required. Therefore, it is possible to reduce the installation cost when installing the shut-off devices 4a to 4c in an existing solar power generation system.

Further, the bypass circuit 15 in the shut-off devices 4a to 4c enables the operation mode of the shut-off devices 4a to 4c to be switched from the emergency safety shut-off mode to the start mode according to the control signal of the control unit 3c.

Although one embodiment of the present invention has been described above, the present invention is not limited to the above embodiment, with various modifications being possible without departing from the gist of the invention.

In the above embodiment, each of the solar cell module groups 5A to 5D includes four solar cell modules 5a, but the number of solar cell modules 5a is not limited to the above embodiment. Further, each of the solar cell module groups 5A to 5D does not necessarily include the same number of solar cell modules 5a. For example, the solar cell module group 5A may include four solar cell modules 5a, and the solar cell module group 5B may include five solar cell modules 5a.

In the above embodiment, the string 2 includes four solar cell module groups 5A to 5D, but the number of solar cell module groups is not limited to the above embodiment. For example, the string 2 may include 5 groups of 5 solar cell modules. Further, the arrangement and the installed number of the shut-off devices 4a to 4c are not limited to the above-described embodiment.

In the above-described embodiment, switching to the emergency safety shut-off mode is performed by operating the operation switch 35, but switching from the start mode or the active mode to the emergency safety shut-off mode is not limited to the above-described embodiment. For example, the solar power generation system 1 may be provided with a sensor that detects the output state of the solar cell modules 5a. The control unit 3c of the inverter 3 may stop the control signal when an abnormality is detected from the output state of the solar cell module 5a detected by the sensor to shut off the connection between the solar cell module groups 5A to 5D. Alternatively, when a fire alarm communicator or a fire alarm is connected to the inverter 3, and the inverter 3 has received a signal from the fire alarm communicator or fire alarm, the inverter 3 may shut off the connection between the groups 5A to 5D by stopping the control signal from the control unit 3c.

REFERENCE NUMERALS

1 Solar power generation system
2 String
3 Inverter
4a-4c Shut-off device
5A-5D Solar cell module group
5a Solar cell module
6 Power line
8a-8c Electrical path
12 Signal receiving unit
15 Bypass circuit

The invention claimed is:
1. A solar power generation system comprising:
   a string including a plurality of solar cell module groups connected in series with each other, each of the solar cell module groups of said plurality of solar cell module groups including a plurality of solar cell modules;

an inverter connected to the string, the inverter configured to convert DC power output from the solar cell modules to AC power; and shut-off devices respectively installed in electrical paths connecting between the solar cell module groups, the shut-off devices configured to sever a connection between the solar cell module groups in accordance with a control signal from the inverter;

wherein each of the shut-off devices includes a signal receiving unit configured to receive the control signal from the inverter, and a bypass circuit configured to cause the signal receiving unit to receive the control signal from the inverter in a state where the connection between the solar cell module groups is cut off; and wherein the shut-off devices are further configured to output a voltage signal to the inverter after severing the connection between the solar cell module groups in accordance with the control signal from the inverter.

2. The solar power generation system according to claim 1, wherein the shut-off devices are driven by electrical power from the solar cell modules.

3. The solar power generation system according to claim 1, wherein the inverter is further configured to output the control signal to the shut-off devices by power line communication.

4. The solar power generation system according to claim 1, wherein the shut-off devices are externally attached to the solar cell modules.

5. The solar power generation system according to claim 1, wherein the total number of shut-off devices installed in said electrical paths is less than the total number of solar cell modules included in the string.

* * * * *